May 16, 1939.  L. E. VOGT  2,158,780
VEHICLE
Filed April 26, 1937
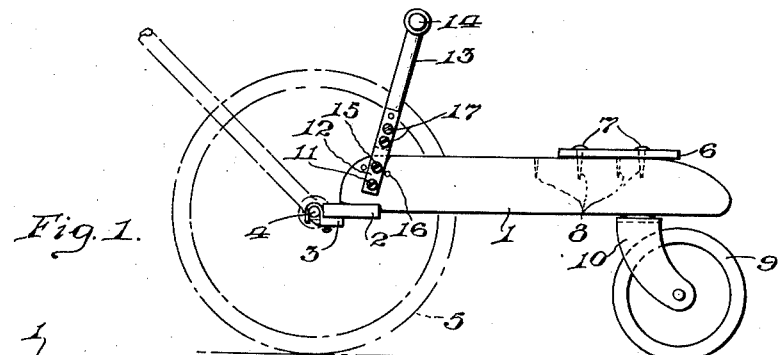
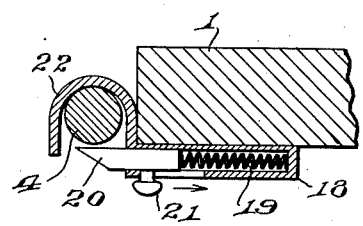
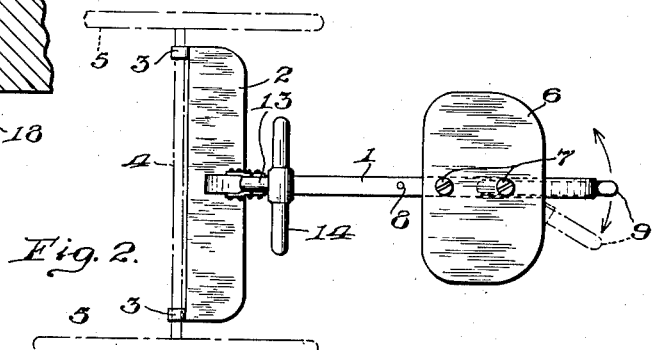
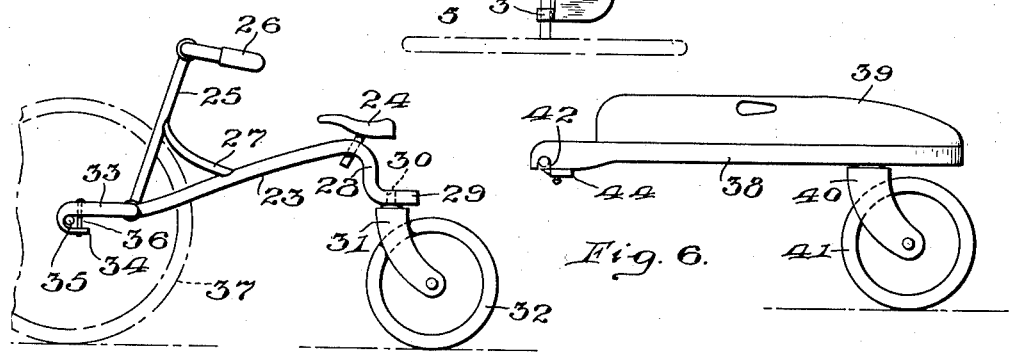
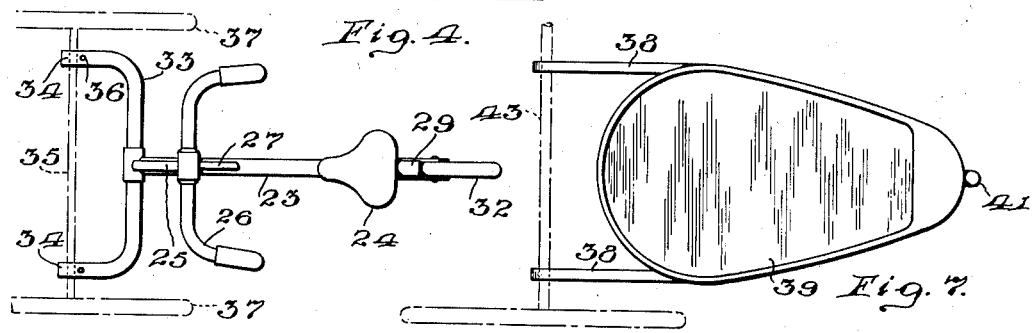
INVENTOR
Lawrence E. Vogt,
BY
J. Stuart Freeman
ATTORNEY Patented May 16, 1939

2,158,780

UNITED STATES PATENT OFFICE 2,158,780

VEHICLE

Lawrence E. Vogt, Lansdowne, Pa.

Application April 26, 1937, Serial No. 139,056

5 Claims. (Cl. 280—204)

The object of the invention broadly is to provide improvements in vehicles, but especially in that type which is known as a trailer, and still more particularly in a trailer which is designed for use in association with tricycles, such as small children ride and are frequently known as velocipedes.

It is well known that even small infants like to ride, but that in the more tender years they are unable themselves to drive a vehicle of any sort; that they, therefore, have to be propelled by others, as when riding in wagons and the like; that all children like to ride in trailing pairs, or more, as the cars of a train, including the act of backing and parking, too, especially when simulating vehicles without tracks, such as automobiles; but that wagons and the like, though well adapted to be drawn, cannot readily be backed in a definite predetermined direction, such as is necessary when backing more than a few inches, and especially when backing into a limited space, as when "parking" an automobile in well-known manner.

Another object, therefore, is to provide a trailer, which even the youngest can ride, and which is particularly designed to be attached to and detached at will from the rear portion of a tricycle, and which will at all times remain in fixed laterally rigid angular relation with the longitudinal axis of the tricycle, whether going forwardly or rearwardly, its rear free end portion being supported by a single trailing wheel, or its equivalent in a pair of such wheels on a single vertical axis, or the obvious equivalent in a large ball bearing.

A further object is to provide a device of this character, which is of such relatively simple construction, that it will be inexpensive to manufacture, and consequently adapted for sale at reasonably low figures, at the same time comprising an upwardly extending longitudinal member, a forward portion normally adapted to be removably attached preferably to the axle of a tricycle, but in any case to laterally spaced portions thereof, so as to cause said longitudinal member to shift axially in direct accordance with angular shifting of the tricycle, as the latter is turned to the left or to the right, a wheel or equivalent support for the rear portion of the device, characterized by a single upright axis, a portion adapted to support the body of the rider in a comfortable position, a transversely extending forward portion, which may be the same as that by which the device is attached to the tricycle, and which last-mentioned portion serves as a rest for the feet of the rider, and if desired suitable handle bars which the rider may grasp when riding.

Still another object is to provide a modified form of the device, in which a hollow body may be employed either for carrying youngsters, who are too small to sit upon a mere seat unrestrained laterally, or for articles such as groceries, toys, and the like, which the rider of the tricycle may wish to transport from place to place.

And a still further object is to provide another modified form of the device, which is adapted to greater expense in manufacture and correspondingly better general appearance, without departing from the inherent simplicity of the basic ideas involved, such second modification being formed from strap metal or metallic tubing, of a construction such as bicycle manufacturers are well equipped to produce, and which construction is susceptible to greater latitude in the use of ornamental details.

With these and other objects in view, such for instance as providing for the adjustability of the device to youngsters of different sizes, the invention comprises further details of construction and operation, which are hereinafter fully brought out in the following description, when read in conjunction with the accompanying drawing, in which Fig. 1 is a side elevation of a trailer, comprising one embodiment of the invention, together with the adjacent rear portion of a tricycle, represented by dot-and-dash lines; Fig. 2 is a top plan view of the same; Fig. 3 is an enlarged longitudinal sectional view of a representative form of detachable latch connection between trailer and tricycle; Fig. 4 is a side elevation of a modified form of trailer, constructed in accordance with the present invention and also showing the adjacent rear portion of a tricycle in dot-and-dash lines; Fig. 5 is a top plan view of the same; Fig. 6 is a side elevation of a still further modified form of trailer and adjacent tricycle axle; and Fig. 7 is a top plan view of the same.

Referring to Figs. 1, 2 and 3, a simple embodiment of the invention is shown as comprising a substantially centrally disposed longitudinally extending member 1, which may be formed of wood, or other available material, preferably stood on edge and provided upon the under side of its forward portion with a laterally projecting transversely extending element 2, which is readily adapted to form a foot-rest for the rider of the trailer, and also forms a support for any desired type of connecting means 3 by which laterally spaced portions of said member 2 are detachably connected to the axle 4 of a tricycle or to other available portions of such device, such tricycle also comprising a pair of laterally spaced rear wheels 5 and the connecting means 3 insuring a laterally rigid connection between the tricycle and trailer, as long as they are operatively connected together.

The upper rear portion of the member 1 is provided wth a laterally projecting, transversely extending seat 6 for supporting an extraneous body, such as the rider of the vehicle, and such seat being detachably connected to said supporting member by means of a pair of screws, or other suitable attaching means 7, which are adapted to enter selective pairs of longitudinally spaced bores or recesses 8 in said supporting member or equivalent adjustable attaching means for said seat. To the rear under portion of said longitudinal member 1 is also pivotally secured suitable anti-friction means, preferably comprising one or more wheels 9, mounted to oscillate laterally upon a substantially vertical axis passing through the connection between said member and the supporting yoke 10 of said wheel or wheels.

By the term trailing wheel or wheels is meant a wheel which will automatically change its plane of rotation about its supporting axle, as the direction of movement of the member 1 is altered, whether going forwardly, rearwardly, laterally toward either side, or any combination of such basic directions of movement. Pivotally connected at 11 to the forward portion of the member 1, and extending in general upwardly therefrom, is the bifurcated lower end portion 12 of an element 13, which is provided on its uppermost free end with laterally extending hand-engageable bars 14, the angular position of the support 13 and the distance of the handle bars 14 from the seat 6 being adjustably fixed by means of a suitable pin 15 extending through the laterally opposite sides of said bifurcated portion and through one of a series of spaced bores 16 in the member 1. Furthermore, the effective height of the handle bars 14 may be altered by shifting the support 13 longitudinally within and with respect to the bifurcated portion 12, to which said support is adjustably secured at selective positions by means of spaced bolts, or the like 17.

One representative type of attaching means between tricycle and trailer is shown in enlarged detail in Fig. 3, wherein the under forward portion of the member 1 is provided with a hollow casing 18, containing a compression spring 19 and latch bolt 20, which latter is manually retracted by means of a stud 21, the forward portion of said casing in front of the member 1 being extended to form an inverted U-shape projection 22 adapted to receive and straddle the rear axle 4 of a tricycle or the like, and said latch bolt being normally positioned beneath such axle, as shown in Fig. 3, in order to thereby prevent accidental disengagement of said U-shaped extension 22 from said axle unless and until said bolt is retracted against the compression of said spring by manually shifting the stud 21 rearwardly. However, it is to be understood that this latch connection is but illustrative of many forms of connecting means which may be well adapted to perform the intended function.

Referring to Figs. 4 and 5, the modification of the trailer here shown is particularly adapted for construction from hollow tubing, such as is commonly used in the manufacture of bicycles and the like. In this case there is provided a rearwardly, upwardly extending, centrally positioned longitudinal member 23, carrying an adjustable seat 24 and an upright 25 to which so-called handle bars 26 are attached for angular adjustment in well-known manner, if desired. Said upright 25 may be further secured with respect to the longitudinal member 23 by means of a diagonally extending brace 27. The rear portion of said longitudinal member 23 to the rear of said seat is preferably bent downwardly at 28 and rearwardly at 29, to provide a pivotal connection 30 for a yoke 31 which operatively supports a trailing rear wheel 32 or its equivalent, as hereinbefore referred to. The lower forward portion of the member 23 is provided with a forwardly extending, preferably U-shaped element 33, the opposite free end portions of which are compressed and bent downwardly and rearwardly at 34 to removably receive spaced portions of the axle 35, and being normally secured thereto by vertically extending pins 36, said axle being supported in the usual manner by means of a pair of laterally spaced wheels 37, shown by dot-and-dash lines.

Referring now to Figs. 6 and 7, a simple form of the device may comprise a horizontally positioned U-shaped frame member 38, carrying a hollow body 39 which, if desired, may be streamlined in conformity with current tendencies, the rear portion of said frame and body being supported by a depending, pivotally mounted bracket 40 carrying a trailer wheel or its equivalent 41 and the forward portions of said frame member being provided with downwardly opening U-shaped recesses 42 adapted to receive spaced portions of the transversely extending axle 43 and said axle normally being operatively maintained in said recesses by means of a suitable latch 44, such as that hereinbefore described and illustrated in Fig. 3.

In the operation of each of the three embodiments of the invention herein shown and described, it will at once be evident that to all intents and purposes the frame members 1, 23 and 38 are normally rigidly secured against lateral movement with respect to the rear portion of a tricycle or even of a toy wagon, so far as that is concerned, so that the trailer as a unit will at all times have its longitudinal axis maintained in the vertical plane coincident with the longitudinal axis of the tricycle, or the wagon, thereby insuring a structure which permits the trailer to be backed into any desired region and position with a corresponding movement of the rear portion of the tricycle or wagon, with a facility equal to the positiveness with which it is normally drawn forwardly as a trailer to the rear of such velocipede, wagon or the like.

Furthermore, in interpreting the appended claims, it is to be understood that the particular form of the device hereinbefore described, and illustrated in the accompanying drawings, is merely illustrative of one embodiment of the invention, and that said invention is capable of being modified in many ways, as to the exact details of its construction and operation, without departing from the scope of the appended claims.

Having thus described my invention, what I claim as new and desire to protect by Letters Patent of the United States is:

1. The combination of a tricycle having two rear wheels and a connecting axle, with a trailer comprising a narrow substantially central longitudinal body member, means extending in opposite directions laterally beyond and operative to detachably connect the forward portion of said member to laterally spaced portions of the tricycle axle, to insure lateral rigidity of said trailer with respect to said tricycle, and a trailing wheel support carried by the rear portion of said body member, pivotally mounted to oscillate about a substantially vertical axis.

2. The combination of a tricycle comprising a frame carrying two rear wheels, with a trailer comprising a narrow substantially central longitudinal body member, means extending in opposite directions laterally beyond and operative to detachably connect the forward portion of said member to laterally spaced portions of the rear of said tricycle frame, to insure lateral rigidity of said trailer with respect to said tricycle, and anti-friction means carried by and operative to support the rear portion of said body member.

3. The combination of a tricycle having two rear wheels, with a trailer comprising a substantially central longitudinal member, means extending in opposite directions laterally beyond and operative to detachably secure the forward portion of said member to laterally spaced portions of the rear of said tricycle, to insure lateral rigidity of said trailer with respect to said tricycle, and a trailing wheel support for the rear portion of said member oscillatable about a substantially vertical axis, said securing means affording a rest for the feet of a person carried by said trailer.

4. The combination of a tricycle having two rear wheels, with a trailer comprising an edge-up narrow substantially central board-like longitudinal member, extending upwardly from the plane of the axes of the tricycle wheels, a transversely extending element carried by and projecting in opposite directions laterally from the opposite sides of the forward portion of said member to provide foot rests, means carried by laterally spaced portions of said element to connect said member to said tricycle, so as to insure lateral rigidity between tricycle and trailer, a support for an extraneous body carried by the upper edge and projecting laterally from the opposite sides of the rear portion of said member, and a depending trailing wheel support carried directly by the rear portion of said member, oscillatable about a substantially vertical axis.

5. The combination of a tricycle having two rear wheels, with a trailer comprising an edge-up narrow substantially central board-like longitudinal member, extending upwardly from the plane of the axes of the tricycle wheels, a transversely extending element carried by and projecting in opposite directions laterally from the opposite sides of the forward portion of said member to provide foot rests, means carried by laterally spaced portions of said element to connect said member to said tricycle, so as to insure lateral rigidity between tricycle and trailer, a support for an extraneous body carried by the upper edge and projecting laterally from the opposite sides of the rear portion of said member, a depending trailing wheel support carried directly by the rear portion of said member, oscillatable about a substantially vertical axis, and an upwardly extending handle member carried by the forward portion of said first member, and the height and angular relation of said handle member with respect to said first member being adjustable.

LAWRENCE E. VOGT.